United States Patent
Broker et al.

(10) Patent No.: US 9,212,821 B2
(45) Date of Patent: Dec. 15, 2015

(54) SYSTEMS AND METHODS FOR CONTROLLING MULTISTAGE ELECTRONIC CONTROLLED GAS VALVES

(71) Applicant: Emerson Electric Co., St. Louis, MO (US)

(72) Inventors: John F. Broker, Warrenton, MO (US); Sachin B. Taware, Pune (IN)

(73) Assignee: Emerson Electric Co., St. Louis, MO (US)

( * ) Notice: Subject to any disclaimer, the term of this patent is extended or adjusted under 35 U.S.C. 154(b) by 200 days.

(21) Appl. No.: 14/184,748

(22) Filed: Feb. 20, 2014

(65) Prior Publication Data

US 2014/0231683 A1 Aug. 21, 2014

(30) Foreign Application Priority Data

Feb. 20, 2013 (IN) .......................... 499/MUM/2013

(51) Int. Cl.
*F16K 31/02* (2006.01)
*F23N 5/24* (2006.01)
*F16K 51/00* (2006.01)

(52) U.S. Cl.
CPC ............... *F23N 5/242* (2013.01); *F16K 31/02* (2013.01); *F16K 51/00* (2013.01)

(58) Field of Classification Search
CPC .......... F23N 5/242; F16K 31/02; F16K 51/00
USPC ........................ 251/129.04; 110/185; 126/52
See application file for complete search history.

(56) References Cited

U.S. PATENT DOCUMENTS

| | | | | |
|---|---|---|---|---|
| 3,954,383 A * | 5/1976 | Bryant | ................... | F23N 5/022 251/129.04 |
| 4,832,594 A | 5/1989 | Youtz | | |
| 5,085,574 A * | 2/1992 | Wilson | .................... | F23N 5/242 251/129.04 |
| 5,126,934 A * | 6/1992 | MacFadyen | ............ | F23N 5/242 251/129.04 |
| 5,524,556 A * | 6/1996 | Rowlette | ................... | F23N 1/06 110/159 |
| 5,590,642 A * | 1/1997 | Borgeson | .............. | F24H 9/2085 126/110 R |
| 2010/0075264 A1 | 3/2010 | Kaplan et al. | | |
| 2012/0214117 A1* | 8/2012 | Broker | ..................... | F23N 1/00 432/47 |
| 2012/0279584 A1* | 11/2012 | Broker | ................... | F23N 1/002 137/487.5 |

* cited by examiner

*Primary Examiner* — John Bastianelli
(74) *Attorney, Agent, or Firm* — Harness, Dickey & Pierce, P.L.C.

(57) ABSTRACT

An electronic control unit for controlling an electronic controlled multistage gas valve (MGV) for adjusting gas flow to a gas fired appliance. In an exemplary embodiment, an electronic control unit generally includes an integrated furnace control (IFC) unit, a multistage gas valve control (MGVC) unit electronically coupled to the IFC unit, and a coil electronically coupled to the MGVC unit. The IFC unit is operable for providing at least one power supply signal over a first communication line and at least one pulse width modulated (PWM) duty cycle signal over a second communication line to the MGVC unit for controlling at least one of energizing and de-energizing of the coil. The electronic controlled MGV is adapted to move in response to a magnetic field generated by the coil.

20 Claims, 5 Drawing Sheets

SYSTEMS AND METHODS FOR CONTROLLING MULTISTAGE ELECTRONIC CONTROLLED GAS VALVES

CROSS-REFERENCE TO RELATED APPLICATION

This application claims the benefit and priority of Indian Patent Application No. 499/MUM/2013, filed Feb. 20, 2013. The entire disclosure of the above application is incorporated herein by reference.

FIELD

The present disclosure relates to systems and methods for controlling gas flow to gas-fired appliances, and more particularly (but not exclusively) relates to an electronic control system for an electronic controlled multistage gas valve for controlling gas flow to such an appliance.

BACKGROUND

This section provides background information related to the present disclosure which is not necessarily prior art.

Conventional electronic control systems for control of gas flow to a gas-fired appliance include a gas valve member that is moved by a magnetic field generated by a coil to vary gas flow rate. For this purpose, a control unit controls actuation of one or more gas valve relays through which power is supplied to the coil. For example, in a typical two-stage heating furnace, at least two gas valve relays (Stage I and Stage II) are provided in the control unit, also referred to as furnace control unit. When there is a call for heat at a particular stage, for example, at Stage II, both the gas valve relays gets ON, and a 24VAC signal is applied to an ON/OFF type gas valve so as to open the gas valve to Stage II.

FIG. 1 shows a typical electronic controlled gas valve system 100 for control of a two-stage gas valve, hereinafter interchangeably referred to as "gas valve". The gas valve (not shown here) can be a mechanical or an electro-mechanical valve driven by a gas valve control unit 104. The gas valve control unit 104 is, in turn, controlled by a control unit 102, which is electronically coupled to the gas valve control unit 104.

The control unit 102 receives a 24VAC input from an AC power source 106, and through gas valve relays R1 and R2, sends 24VAC signals to the gas valve control unit 104 over wires w1 and w2. The relays R1 and R2 may be part of a consolidated relay unit 105 having one or more relays integrated into it as per the requirement. Typically, the relays R1 and R2 are coupled to the AC power source through at least one rectifier circuit (not shown here), typically a half-bridge rectifier, such that the rectifier circuit provides a half-wave rectified supply to the relay coil(s) for switching them ON/OFF. Also, an un-rectified 24VAC supply is provided to relay contacts so that the relays R1 and R2 send 24VAC signals to the gas valve control unit 104.

Further, the gas valve control unit 104 is shown to include two hardware circuits 108 and 110. The hardware circuits 108 and 110 are configured to process the signals received from the respective relays R1 and R2 of the control unit 102. Outputs from the respective hardware circuits 108 and 110 are sent to a controller device 112, such as a microcontroller, which is configured to control energizing/de-energizing of a coil 124 coupled to the gas valve control unit 104. In operation, the hardware circuits 108 and 110 detect the presence of signals from the relays R1 and R2 for the controller device 112. When there is a call for heat, for example, at Stage II, both the relays R1 and R2 send 24VAC signals to the gas valve control unit 104. The hardware circuits 108 and 110 make the 24VAC signals from the two relays R1 and R2 out of phase. The controller device 112 checks whether the received signals are out of phase with each other before it opens the mechanical gas valve for Stage II.

The microcontroller 112 is powered by a microcontroller power supply 114, which is in series connection to a power supply circuit 116 of the gas valve control unit 104. The power supply circuit 116 gets power from the 24VAC power source 106 through relay R1. When there is a call for heat, relay R1 gets energized and provides 24VAC power to the gas valve control unit 104.

Apart from receiving the signals from the hardware circuits 108 and 110, the controller device 112 may also receive other input signals, for example, input from a gas selection unit 118, which could suggest an alternative fuel source and/or inputs from a first and a second gas valve feedback units 120 and 122, which could be photo-interrupters used for determining current position of the two-stage gas valve. The first and second feedback units 120 and 122 may provide analog or digital signals to indicate the current position of the gas valve.

The controller device 112 processes the inputs to provide output signals for regulating power supplied to the coil 124. For this purpose, the coil 124 is coupled to the controller device 112 via two voltage-controlled switching devices 126 and 128, which may include field-effect transistors (FETs) or similar devices. The microcontroller provides a digital voltage signal, such as a "High" signal or "Low" signal, to one of the switching devices (e.g., switching device 126), and a pulse width modulated (PWM) duty cycle signal to the other switching device (e.g., switching device 128). Based on the signals received, the switching devices 126 and 128 control magnetization of the coil 124, which consequently impacts a current position of the two-stage gas valve so as to control the gas flow through the gas valve to the gas-fired appliance.

In the conventional control systems for controlling the movement of the gas valve as discussed above, at least two gas valve relays are required. The cost of implementing two gas valve relays is relatively high. In addition, there are also space constraints.

Moreover, if the Stage I or the Stage II gas valve relay gets stuck or the associated hardware fails due to some reason, the 24 VAC signal nevertheless is constantly applied to the gas valve control unit and the associated coil and/or the gas valve may remain continuously energized or open.

In conventional control unit designs, such a state is displayed as an "error" condition and the control unit operates towards turning the gas valve relays OFF. But since one or more of the gas valve relays has already failed, the control unit does not have the actual control of the operation of the gas valve, and the gas may continue to leak unchecked from the gas valve.

Further, in case of a multiple stage gas valve control (control of more than two stages), the conventional control units communicate with the gas valve through communication protocols, such as Climate Talk®, to operate the valve in a particular stage. Implementation of a communication network may be a relatively cost intensive approach, which may increase the overall cost of the control system.

There seems to be certain solutions available in the market for controlling the operation of electronically controlled gas valves as discussed above. For example, U.S. Pat. No. 4,832,594 provides a control system with time redundancy, wherein the integrated controller is designed to have 3 timers. Two of the timers form the lower and upper time limits, during which the third timer must enable the gas valve relay. If any of the timers is faulty, the gas valve relay will not work.

Further, US20100075264 discloses a redundant ignition control circuit that includes a main microprocessor and a supervisory microprocessor, which communicate with each other through PWM signals. Each microprocessor uses a PWM signal to activate the relay under its control, based on the current mode of operation of the gas valve. The relays may be replaced with MOSFETs or BJTs in different implementations. But these aforesaid solutions have limitations and are vulnerable to safety lapses on the part of the technician. Moreover, there is a need for solutions that are cost efficient, simple to implement, and have easy back or reverse compatibility.

SUMMARY

This section provides a general summary of the disclosure, and is not a comprehensive disclosure of its full scope or all of its features.

According to aspects of the present disclosure, exemplary embodiments are disclosed of an electronic control unit for controlling an electronic controlled multistage gas valve (MGV) for adjusting gas flow to a gas fired appliance. In an exemplary embodiment, an electronic control unit generally includes an integrated furnace control (IFC) unit, a multistage gas valve control (MGVC) unit electronically coupled to the IFC unit, and a coil electronically coupled to the MGVC unit. The IFC unit is operable for providing at least one power supply signal over a first communication line and at least one pulse width modulated (PWM) duty cycle signal over a second communication line to the MGVC unit for controlling at least one of energizing and de-energizing of the coil.

In accordance with aspects of the present disclosure, there are disclosed exemplary methods of controlling operation of an electronic controlled multistage gas valve of a gas fired appliance is described. In an exemplary implementation, a method generally includes detecting the presence of a power supply signal from an integrated furnace control unit, detecting the presence of a pulse width modulated duty (PWM) cycle signal from the integrated furnace control unit, and at least one of energizing and de-energizing a coil of a MGVC unit based on the detecting of the presence of the power supply signal and the PWM duty cycle signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
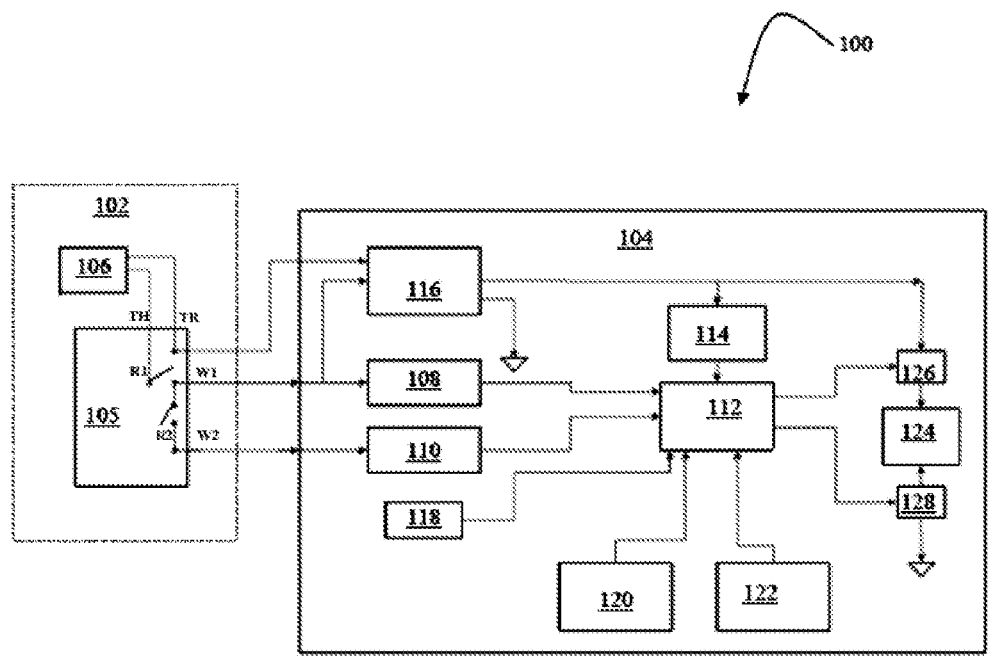
FIG. 1 illustrates a block representation of a conventional two-stage gas valve control system.
Figure 2:
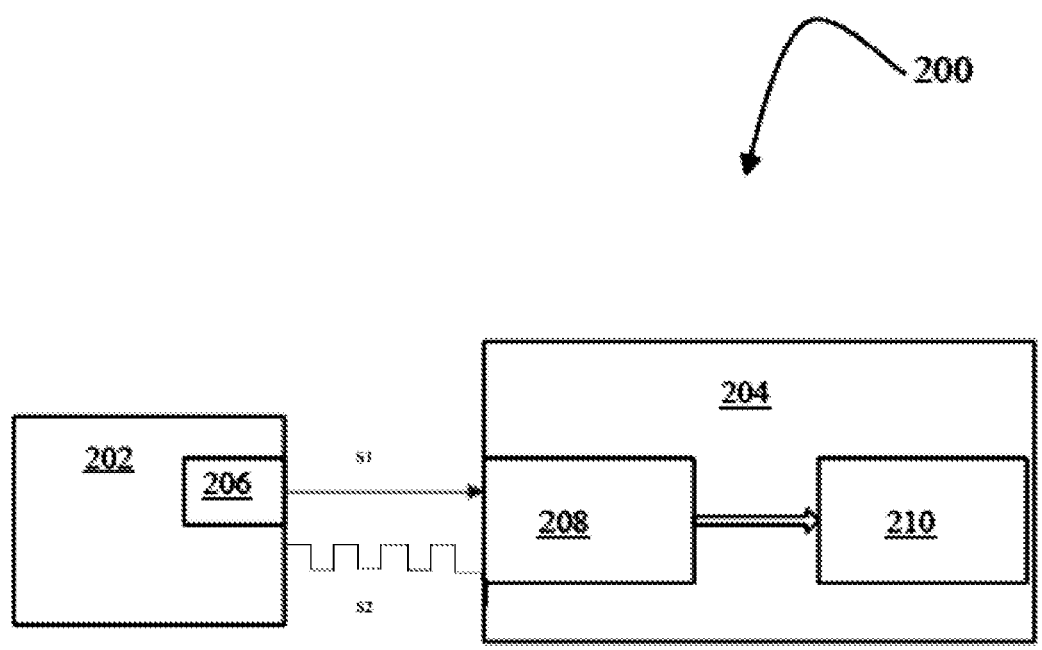
FIG. 2 illustrates a block representation of an electronic control system for controlling a multistage gas valve, in accordance with an embodiment of the present disclosure.
Figure 3:
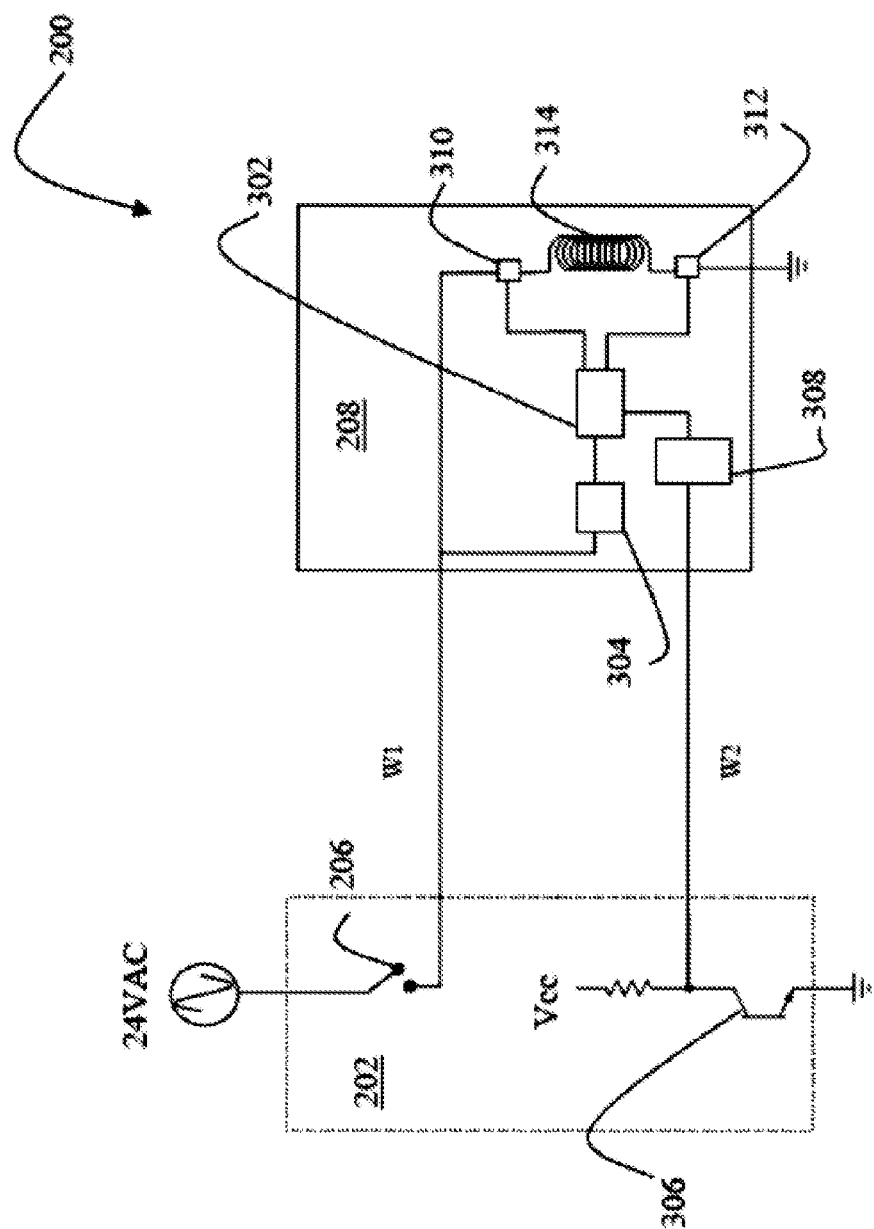
FIG. 3 illustrates a schematic representation of the electronic control system of FIG. 2, in accordance with an embodiment of the present disclosure.
Figure 4:
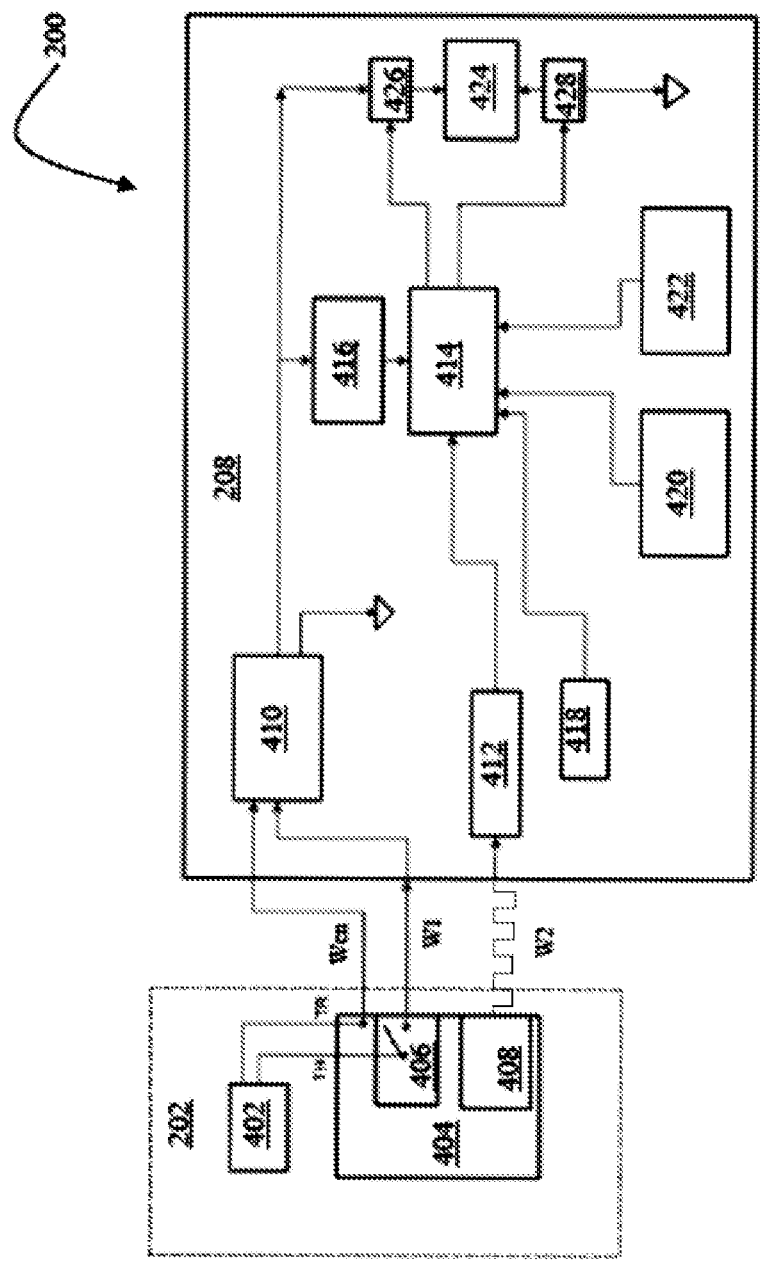
FIG. 4 illustrates a detailed block representation of the electronic control system of FIG. 2, in accordance with an embodiment of the present disclosure.

FIGS. 2 to 4 show an electronic control system 200 for controlling a multistage electronically-controlled gas valve in accordance with one or more embodiments of the present disclosure. As shown in FIG. 2, the electronic control system 200 includes an integrated furnace control (IFC) unit 202 and an electronic gas valve unit 204. The electronic gas valve unit 204 further comprises a multistage gas valve control unit (MGVC) 208. The integrated control unit 202 controls operations of the MGVC unit 208, which, in turn, governs the controlling of a mechanical gas valve 210 coupled to the MGVC unit 208.

In an embodiment, the IFC unit 202 includes a gas valve relay 206, which turns ON whenever there is a call for heat. For example, in an embodiment, a user makes a call for heat by sending a signal to the IFC unit 202 to turn ON the electronic control system 200.

In an implementation, a 24VAC signal (S1) is applied to the MGVC unit 208 through the gas valve relay 206. In addition, the IFC unit 202 sends a pulse width modulated (PWM) duty cycle signal (S2), or simply PWM signal, to the MGVC unit 208. In an embodiment, the IFC unit 202 includes a transistor configured to generate a PWM signal with a desired duty cycle.

The MGVC unit 208, based on the PWM signal with the desired duty cycle, for example, a 50% duty cycle or a 100% duty cycle, opens the valve to the respective stage. So even though the MGVC unit 208 is ON because of the 24VAC signal being received continuously through the gas valve relay 206, the MGVC unit 208 will not turn the mechanical gas valve 210 to a different position of functioning unless the MGVC unit 208 also receives the PWM signal from the IFC unit 202. Thus, in case the IFC unit 202 gets stuck and the MGVC unit 208 continuously receives the 24VAC signal, the MGVC unit 208 will not turn the mechanical gas valve 210 ON unless the desired PWM signal is not sensed by the MGVC unit 208.

Further, the electronic control system 200, which has only one gas valve relay 206 provided in the IFC unit 202, also provides for varied stages of operation of the mechanical gas valve 210 by providing a PWM signal with different duty cycles. Thus, the electronic control system 200 uses a single gas valve relay 206 and a PWM signal to control varied operations of the mechanical gas valve 210.

FIG. 3 shows a schematic representation of the electronic control system 200 of FIG. 2. As shown in the IFC unit 202, a 24 VAC signal is applied to contacts of the gas valve relay 206. While through a half-wave bridge (not shown), a DC supply from the 24VAC is applied to power a relay coil of the gas valve relay 206 and the rest of the low voltage circuits, like a microprocessor. The half-wave bridge makes the relay coil magnetized and switches the gas valve relay 206 to ON/OFF states. The gas valve relay 206, through its contacts, is coupled to a primary controller 302, such as a microcontroller, of the MGVC unit 208 over wire w1. On the other hand, the MGVC unit 208 may include a dedicated power supply 304 for controlling a power supply to the primary controller 302. The dedicated power supply 304 may be powered by the 24VAC power supply over a common line (not shown here).

Further, a switching device 306 (e.g., a transistor or an isolated switching device, etc.) is provided in the IFC unit 202, which is configured to provide a PWM signal with a predefined duty cycle. The PWM signal is applied to the primary controller 302 via a hardware circuitry 308 over line w2. In an embodiment, the hardware circuitry 308 may include an optoisolator for isolating an input side from an output side so as to provide an isolated PWM signal. The primary controller 302 is further coupled to a coil 314 through appropriate switching devices 310 and 312. In an embodiment, the switching devices 310 and 312 may include field-effect transistors and the likes. The primary controller 302 controls energizing/de-energizing of the coil 314, which, in turn, governs the controlling of the mechanical gas valve 210. In an implementation, the coil 314 may include a coil of a stepper motor, which upon activation of the coil 314 changes a position of the mechanical gas valve to predefined steps.

In an implementation, the primary controller 302 sends a digital voltage signal, such as a "High" signal or "Low" signal, to one of the switching devices (e.g., switching device 312), and a pulse width modulated (PWM) duty cycle signal to the other switching device (e.g., switching device 310). Based on the signals received, the switching devices 310 and 312 control magnetization of the coil 314, which consequently manipulates a position of the mechanical gas valve.

FIG. 4 shows a detailed block representation of the electronic control system 200 of FIG. 2. In an embodiment, the electronic control system 200 includes the IFC control unit 202 and the MGVC unit 208. In the IFC unit 202, a common power supply 402 is coupled to a gas valve relay 406. The gas valve relay 406 is switched when there is a call for heat. In an embodiment, the common power supply 402 provides a 24VAC power supply to the gas valve relay 406 through contacts of the gas valve relay 406. In addition, the IFC unit 202 may include a PWM generation unit 408, which generates a PWM duty cycle signal. The PWM generation unit may include components such as a transistor or a microprocessor capable of providing a PWM duty cycle signal. The IFC unit 202 is electronically coupled to the MGVC unit 208 through wires w1 and w2 for supplying the 24VAC signal and the PWM duty cycle signal respectively. In addition, a common wire Wcn is provided, which powers a power supply unit 410 of the MGVC unit 208.

The 24VAC supply 402 powers the power supply unit 410 of the MGVC unit 208 through the gas valve relay 406. Further, the power supply unit 410 is coupled to a dedicated power supply 416, which powers a primary controller 414 (e.g., a microcontroller, etc.) of the MGVC unit 208. The primary controller 414, in addition to receiving the 24VAC signal through the gas valve relay 406, also receives the PWM duty cycle signal from PWM generation unit 408 over wire w2.

Apart from receiving the 24VAC signal and the PWM duty cycle signal, the primary controller 414 also receives other input signals, for example, input from a gas selection unit 418, which could suggest an alternative fuel source and/or inputs from a first and a second gas valve feedback units 420 and 422, which could be photo-interrupters used for determining current position of the two-stage gas valve. The first and second feedback units 420 and 422 may provide analog or digital signals to indicate the current position of the mechanical gas valve.

The primary controller 414 processes all the inputs to provide output signals for regulating power supplied to a coil 424. In an embodiment, the coil 424 is coupled to the primary controller 414 via two voltage-controlled switching devices 426 and 428, which may be field-effect transistors (FETs) or similar devices.

The primary controller 414 provides a digital voltage signal, such as a "High" signal or "Low" signal, to one of the switching devices, say the switching device 426, and a pulse width modulated (PWM) duty cycle signal to the other switching device, which is the switching device 428. Based on the signals received, the switching devices 426 and 428 control magnetization of the coil 424, which consequently impacts a current position of the two-stage gas valve so to control the gas flow through the gas valve to the gas-fired appliance.

Figure 5A:
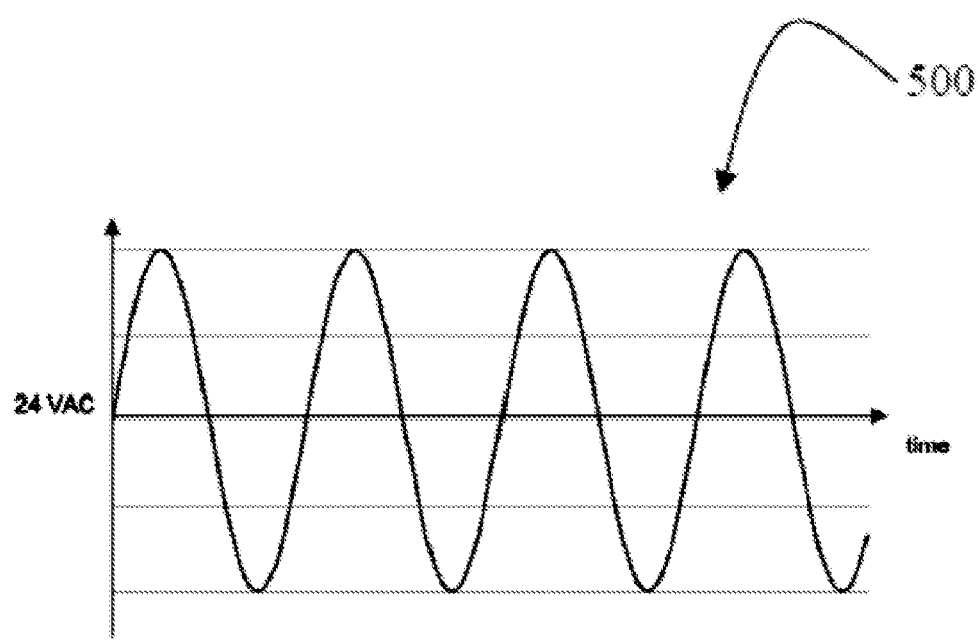
FIGS. 5A and 5B respectively illustrate an AC signal and a PWM signal as sent from an integrated furnace control unit of the electronic control system of FIG. 2.
Figure 5B:
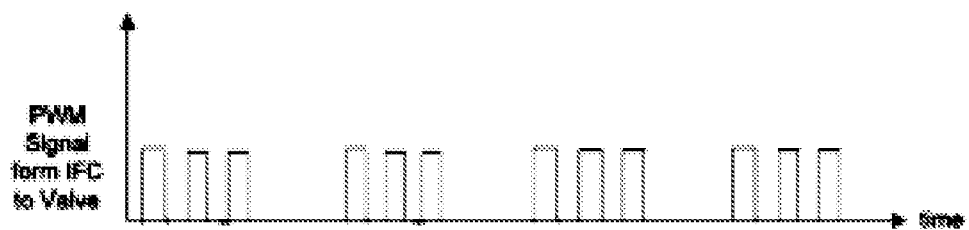

FIG. 5 shows representations of the 24VAC signal and the PWM duty cycle signal provided to the MGVC unit 208. The IFC unit 202 may be made compatible to the existing MGVC unit 104 without much or with little design alterations. For example, in the electronic control unit 200, the IFC unit 202 is provided with a half-bridge rectifier, whereas the MGVC unit 104 uses a full wave rectifier. Due to this, GROUND reference points for the IFC unit 202 and the MGVC unit 104 are different. In such a case, when TH is positive with respect to TR, a negative side of the full wave rectifier is only a diode drop above TR. Since the GROUND of the IFC unit 202 is TR and the GROUND of the mechanical valve is only diode drop above TR, the two GROUNDs do not have much difference and therefore PWM duty cycle can be transmitted during this state. On the other hand, when TH is negative with respect to TR, then the two GROUNDs have very different potentials—the GROUND of the mechanical valve being very positive. During this period, the PWM duty cycle signal cannot be transmitted (the blank portion shown in FIG. 5b). In this state, the MGVC unit 104 may interpret the 24VAC signal being received from the conventional control unit 102, and operates accordingly through the one or more relays provided in the consolidated relay unit 105.

In another scenario, one may implement an optoisolator to isolate the PWM duty cycle signal at a gas valve side of the MGVC unit 104 because in the MGVC unit 104, a GROUND of the controlling device 112 is at a different potential than a GROUND of the power supply to the coil 124.

In an exemplary embodiment, both a 24VAC signal and a PWM signal to a gas valve (e.g., 2 stage on/off type valve) may be used to enable flow and set the stage. This, in turn, allows the use of a transistor in place of a relay on the gas valve panel. In this example, the microprocessor will not enable the coil unless it has both the 24VAC signal and the PWM input. In this example, there is a 3 wire-connection to the gas valve for the 24VAC, PWM, and common, respectively. The microprocessor may be resident on the gas valve and require both the 24VAC and the PWM signal from the IFC for operation. The microprocessor wakes up upon the application or receipt of the 24VAC signal, but doesn't activate the valve coils until it also has the PWM signal.

Exemplary embodiments of electronic control units disclosed herein may provide one or more (but not necessarily any or all) of the following advantages. For example, exemplary embodiments may use only one relay to control operation of an electronic operated valve instead of having two or more relays. This allows costs to be reduced by eliminating the additional relay costs and circuitry supporting the same. Exemplary embodiments may include circuitry to transfer and receive the PWM duty cycle signal that is less costly than the relay cost. With the inclusion of PWM duty cycle signal in exemplary embodiments, a double check for safety may be provided before the mechanical gas valve is actually turned ON. Also for example, the MGVC unit 208 may be configured so that it will not open the mechanical valve until it detects a proper PWM duty cycle signal, even when the 24VAC signal is being continuously detected. Because of such an arrangement, unwanted gas valve operation can be avoided. The operation of the IFC unit 202 may be upgraded up to multiple (modulating) stages (e.g., 3, 4, 5 stages, etc.) by providing a different duty cycle signal without adding cost to the electronic control unit. Further, diagnostics circuitry may be added to the MGVC unit 208 to display different error conditions. The electronic control unit 200 may be made compatible for traditional IFC units.

Exemplary embodiments may include a system for controlling a multistage electronic controlled gas valve (gas valve) that is inexpensive as compared to conventional systems used for the same purpose. Exemplary embodiments may include a system for controlling a multistage electronic controlled gas valve that is less dependent on relay-based signalling for achieving the desired control of the gas valve. Exemplary embodiments may include an electronic controlled gas valve system that is compatible with existing electronic controlled gas valve systems. Exemplary embodiments may include a system for controlling an electronic controlled multistage gas valve that is capable of handling various stages of gas flow to a gas fired appliance with minimum or no modifications. Exemplary embodiments may include systems and methods for controlling a multistage electronic controlled gas valve that are safe and reliable.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. For example, the numerical values mentioned for the various physical parameters, dimensions, or quantities may only be approximations, and it is envisaged that the values higher/lower than the numerical values assigned to the parameters, dimensions, or quantities may fall within the scope of the disclosure, unless there is a statement in the specification specific to the contrary. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The use of the expression "at least" or "at least one" suggests the use of one or more elements or features, as the use may be in the embodiment of the disclosure to achieve one or more of the desired results.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Any discussion of documents, acts, materials, devices, articles or the like that has been included in this specification is solely for the purpose of providing context for the disclosure. It is not to be taken as an admission that any or all of these matters form part of the prior art base or were common general knowledge in the field relevant to the disclosure as it existed anywhere before the priority date of this application.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling an operation of an electronic controlled multistage gas valve of a gas fired appliance, the method comprising:
    detecting the presence of a power supply signal from an integrated furnace control unit (IFC);
    detecting the presence of a pulse width modulated (PWM) duty cycle signal from the integrated furnace control unit; and
    at least one of energizing and de-energizing a coil of a multistage gas valve control (MGVC) unit based on the detecting of the presence of the power supply signal and the PWM duty cycle signal.

2. The method of claim 1, further comprising isolating the PWM duty cycle signal after detecting the presence of the PWM duty cycle signal.

3. The method of claim 1, wherein a position or functioning of the electronic controlled multistage gas valve is not changeable unless the presence of both the power supply signal and PWM duty cycle signal are detected.

4. An electronic control unit for controlling an electronic controlled multistage gas valve (MGV) for adjusting gas flow to a gas fired appliance, the electronic control unit comprising:
    an integrated furnace control (IFC) unit;
    a multistage gas valve control (MGVC) unit electronically coupled to the IFC unit; and
    a coil electronically coupled to the MGVC unit;
    wherein the IFC unit is operable for providing at least one power supply signal over a first communication line and at least one pulse width modulated (PWM) duty cycle signal over a second communication line to the MGVC unit for controlling at least one of energizing and de-energizing of the coil; and
    wherein the electronic controlled MGV is adapted to move in response to a magnetic field generated by the coil.

5. The electronic control unit of claim 4, wherein the IFC unit and the MGVC unit are powered through a common power supply.

6. The electronic control unit of claim 5, wherein the common power supply is operable for supplying a 24VAC.

7. The electronic control unit of claim 4, wherein the IFC unit comprises at least one relay and at least one PWM generation unit.

8. The electronic control unit of claim 7, wherein the at least one PWM generation unit comprises a transistor.

9. The electronic control unit of claim 7, wherein the at least one PWM generation unit comprises a microcontroller.

10. The electronic control unit of claim 7, wherein the at least one relay is coupled to the common power supply via a half-bridge rectifier.

11. The electronic control unit of claim 4, wherein the MGVC unit comprises at least one opto-coupling device for isolating the PWM duty cycle signal received from the IFC unit.

12. The electronic control unit of claim 4, wherein the MGVC unit comprises a primary controller that is configured to receive and process the PWM duty cycle signal and the power supply signal from the IFC unit.

13. The electronic control unit of claim 12, wherein the primary controller is a microcontroller.

14. The electronic control unit of claim 4, wherein the coil is coupled to the MGVC unit through one or more field effect transistors.

15. The electronic control unit of claim 4, wherein the coil comprises at least one coil of a stepper motor that is configured to move the electronic controlled MGV based on an input to the coil.

16. The electronic control unit of claim 4, wherein the IFC unit includes only one gas valve relay.

17. The electronic control unit of claim 4, wherein the electronic control unit includes a single gas valve relay provided in the IFC unit, and wherein the electronic control unit is operable controlling varied operations of the MGV by using the single gas valve relay and the PWM duty cycle signal.

18. The electronic control unit of claim 4, wherein the IFC unit includes a half-bridge rectifier, and wherein the MGVC unit includes a full wave rectifier.

19. The electronic control unit of claim 4, wherein the electronic control unit is configured to be operable such that a position or functioning of the electronic controlled MGV is not changeable unless the MGVC unit receives both the power supply signal and the PWM duty cycle signal from the IFC unit.

20. A system comprising:
    a gas valve for adjusting gas flow to a gas fired appliance; and
    an electronic control unit for controlling opening and closing of the gas valve, the electronic control unit including:
        an integrated furnace control (IFC) unit including a single gas valve relay;
        a multistage gas valve control (MGVC) unit electronically coupled to the IFC unit;
    wherein the IFC unit is operable for providing at least one power supply signal and at least one pulse width modulated (PWM) duty cycle signal to the MGVC unit; and
    wherein the electronic control unit is configured to be operable such that a position or functioning of the gas valve is not changeable unless the MGVC unit receives both the power supply signal and the PWM duty cycle signal from the IFC unit.

* * * * *